United States Patent [19]
Thomason et al.

[11] 3,910,253
[45] Oct. 7, 1975

[54] FLAT ROOF SOLAR HEATED BUILDING

[76] Inventors: Harry E. Thomason; Harry Jack Lee Thomason, Jr., both of 6802 Walker Mill Road, S.E., Washington, D.C. 20027

[22] Filed: Feb. 19, 1974

[21] Appl. No.: 443,197

Related U.S. Application Data

[62] Division of Ser. No. 273,865, July 21, 1972, abandoned.

[52] U.S. Cl. ............................................... 126/271
[51] Int. Cl.² ............................................. F24J 3/02
[58] Field of Search .................... 126/271; 237/1 A

[56]  References Cited
UNITED STATES PATENTS

| | | | |
|---|---|---|---|
| 1,325,596 | 12/1919 | Trosper | 126/271 |
| 1,889,238 | 11/1932 | Clark | 126/271 |
| 3,174,915 | 3/1965 | Edlin | 126/271 X |
| 3,215,134 | 11/1965 | Thomason | 126/271 |
| 3,314,414 | 4/1967 | Rowekamp | 126/271 |
| 3,453,666 | 7/1969 | Hedges | 126/271 X |
| 3,595,216 | 6/1970 | Lanciault | 126/271 |

FOREIGN PATENTS OR APPLICATIONS

| | | | |
|---|---|---|---|
| 1,023,132 | 3/1953 | France | 126/270 |

*Primary Examiner*—William F. O'Dea.
*Assistant Examiner*—Peter D. Ferguson

[57]  ABSTRACT

A solar heated building has a substantially flat roof with a substantially horizontal solar heat collector on top. The solar heat collector is of a type known as a shallow pond, or a plurality of shallow ponds, preferably covered by a transparency. The pond-type solar heat collector area is extended out beyond the area of the building itself in an overhanging fashion.

A transparent cover over the pond may be air supported, or may have a dome shape or such, to discharge cold rain and increase efficiency for solar heat collection.

A plurality of shallow ponds may be arranged in stair-step fashion to increase solar heat collection in winter when the sun is lower in the sky.

4 Claims, 7 Drawing Figures

FLAT ROOF SOLAR HEATED BUILDING

This is a division, of application Ser. No. 273,865, filed July 21, 1972 and now abandoned.

INTRODUCTION

For rather cold climates where many cloudy days occur during the winter a flat-plate type of solar heat collector is generally set at a fairly steep angle (about 45° to 60° as in U.S. Pat. No. 3,145,707, granted to Harry E. Thomason. The heat is collected and stored in a heat storage bin in a basement area as in U.S. Pat. No. 3,254,702, granted to Harry E. Thomason. That combination of collector and storage has provided near 95% of the heat requirements for a three-bedroom home in the area of Washington, D. C. where the temperature drops below the freezing mark often, where near half of the days are cloudy, and where snow, ice and cold rain are common, (see Solar Energy Journal, Vol. X, No. 1, Jan. 1966, pages 17–22).

For areas where heating of buildings by solar energy is not as difficult the "Sunny South" model has been developed, described in the book "Solar Houses and Solar House Models," Second Edition, page 15, by Harry E. Thomason, published by Edmund Scientific Company, 605 Edscorp Building, Barrington N.J, 08007, Library of Congress Catalog Card No. 72-25084. A shallow pond of water on the roof, preferably covered by a transparent member, warms the water daily. The water flows to "pancake" heat storage space under the floors to warm the floors and building.

If a shallow pond of water were constructed on a roof in a conventional manner, the supporting members would have to be fairly strong to minimize bending. That would increase the cost of the building. Also, if the roof-pond were only as large as the building itself, it would intercept only the amount of solar energy falling on the limited roof area. Therefore, the amount of heat would not be adequate for some of the cold nights and cloudy days. By providing an overhanging heat collector, as taught in the present application, with or without supporting columns, the collector area may be increased significantly without heavy roof timbers.

If no protective cover were provided, cold rain falling on a solar heat collecting pond would have to be heated to be useful for solar heating of the building. Evaporation of a part of such water, and evaporation of water from the pond, would waste much valuable solar-produced heat. In the present invention cover means reduce such heat loss. Also, if the small ponds are stair-stepped they collect more solar heat, per gallon of water being warmed, during the winter when the sun is low in the sky.

The present invention helps solve the problems discussed above, and provides other benefits as will become apparent to those skilled in the art.

BRIEF SUMMARY

The present invention provides a solar heated building, with a substantially flat roof, with an overhanging area for a solar heat collector or collectors of the pond type. The heat collecting area may have many ponds, and reflectors if desired.

By using the roof overhang and rooftop pond approach of the present invention at least six advantages are obtained:

1. The heat collecting area is increased, to provide more free solar heat.
2. The roof area is cantilevered to support the weight of the pond of water with less bending of the roof beams and a minimum sagging of the ceiling inside. The larger pond area does not need to be as deep.
3. The roof-pond overhand protects the sides of the building from the weather.
4. The roof-pond overhang shade during the hot summer months.
5. The overhang provides a covered walkway area around the building and protects the area from the rain, snow, sleet and so on.
6. The architectural appearance of the building is improved. Colonial style columns may be provided, if desired, to enhance the beauty, or to help support the overhanging area, or both.

By covering the pond with an air supported or a dome-like covering, cold rain does not enter the solar heat collecting pond. And, the warm air trapped above the pond reduces heat losses from the pond on cold days.

IN THE DRAWINGS

The solar heated building illustrated at 1 may be a home, factory, warehouse, or other, and may have conventional doors 2 and windows 3. If desired a reflector 4 may be provided along the north edge of the building to intercept sunlight that would normally pass over the top of the building and reflect it down into the rooftop heat collecting pond 5.

Figure 1:
FIG. 1 is a side elevational view of one embodiment, partly in cross section.
Figure 2:
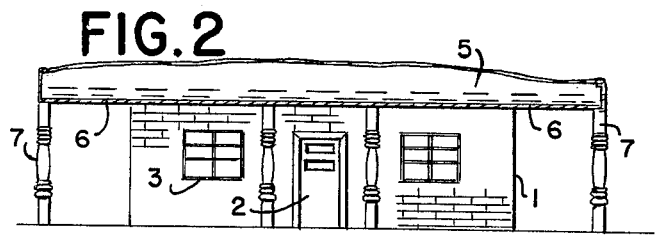
FIG. 2 is a view illustrating a modification.
Figure 4:
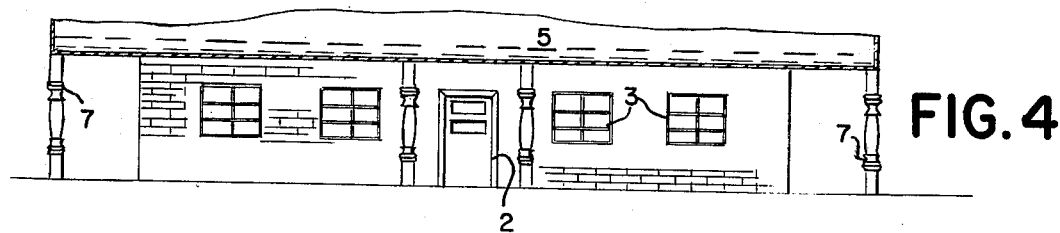
FIG. 4 is a side elevational view illustrating a larger building.

The rooftop heat collecting area extends beyond the periphery of the building as illustrated at 6. The overhanging area may extend outwardly in cantilever fashion as illustrated in FIG. 1. Or, the overhanging area may be supported, or partially supported by columns 7, as in FIGS. 2 and 4. Columns 7 may be utilized to beautify the building, in Colonial styling, even if they are not used to support the overhanging area 6. In that event the columns may by "dummy" columns, more-or-less free standing without actually supporting the overhanging area. That would leave the overhanging area, and the weight of the water in the pond thereabove, to counterbalance a portion of the pond area above the building area. Or, the overhanging area may be made larger, in which event the columns support the additional weight without the necessity of extra-heavy, roof-supporting members.

To illustrate the value of the overhang, in terms of solar heat collecting area, let us assume the building to be a more-or-less standard 24 by 42 foot size house. Assume the overhang to be six feet. The building will cover 1,008 square feet while the heat collecting area covers 1,944 square feet. That substantially doubles the solar heat collecting area and the solar energy received by the collector. From another viewpoint, the water in the pond can be about half as deep and yet have the same number of gallons. Therefore, the water will become warmer, and the roof timbers may be much lighter and less expensive, due to the shallower pond supported thereabove. This is all-the-more true due to the cantilever feature, with the weight over the overhanging area partially counterbalancing the weight over the building. Indeed, by proper design, a substantially perfect counterbalance can be achieved.

The overhang also helps protect the building from weathering and provides a walkway area around the building protected from rain, snow, etc. in the winter. It also helps protect from the hot sun in the summer. This helps keep the building cool. And, the larger pond area provides far more cooling of the water on the rooftop at night, as taught in U.S. Pat. No. 3,295,591, by Harry E. Thomason.

The rooftop pond area itself may be a single pond or a series of smaller ponds as disclosed in Ser. No. 153,339. During the winter, cold rain, wind, etc. on the pond area could waste away heat from the rooftop. If cold rain were allowed to remain on or in the rooftop pond or ponds, much solar heat would be wasted in warming it. Or, cold wind would waste away much of the heat if it were allowed to blow directly onto the pond surface, or if it were allowed to blow directly onto a transparent or opaque cover in contact with the top of the water in the pond. To reduce such losses, preferably one or two transparent films or members are placed above the pond, as described more particularly hereafter.

Figure 5:
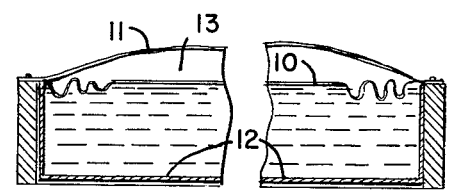
FIG. 5 is a detail of a heat collecting pond and covers.

FIG. 5 illustrates details of a type of rooftop pond usable on a flat roof building. One is illustrated at 10 and another at 11. The pond liner 12 is preferably substantially black, to absorb solar energy passing through the clear water to heat the water. The inner transparency 10 may be a plastic film, a clear film of oil or other liquid lighter than water, or a thin layer of clear insulating foam as in U.S. Pat. No. 3,303,838, by Harry E. Thomason, or even black as explained hereinafter. The outer transparency 11 may be a rigid transparent bubble of glass or plastic, or such. Or, it may be a plastic film, supported in bubble-like fashion, by air trapped in space 13. Or it may be a film, or glass, supported by conventional struts. If desired, transparency 10 may be eliminated, or it also may be supported above the water by air trapped between the transparency and the water. The bubble-supporting air may be simply trapped under the transparency or transparencies, or it may be blown in by a small low-pressure blower, or by funneling wind into the space under the transparency through a simple low-pressure check valve damper.

Although element 10 is described as transparent, it may be black, in which case it will become warm, as it intercepts solar energy, and will warm the water therebeneath.

A pipe, or pipes, may be used to introduce water to be heated and to extract heat water from the pond area, as described in application Ser. No. 153,339.

Figure 6:
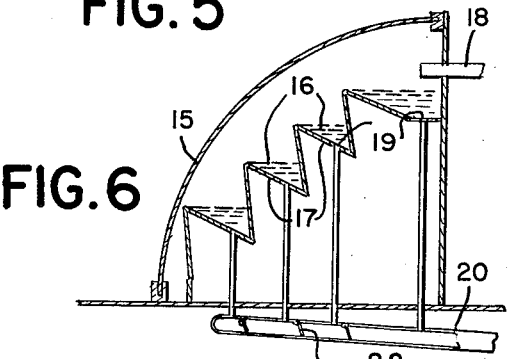
FIG. 6 is a cross section of modified small heat collecting ponds.
Figure 7:
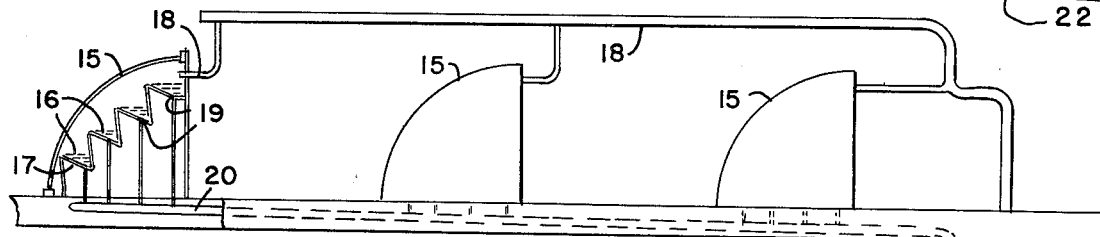
FIG. 7 is a diagrammatic illustration of a series of groups of small ponds on a flat roof building.
Figure 3:
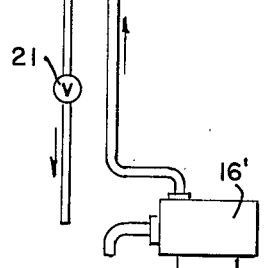
FIG. 3 is a floor plan.
Figure 3:
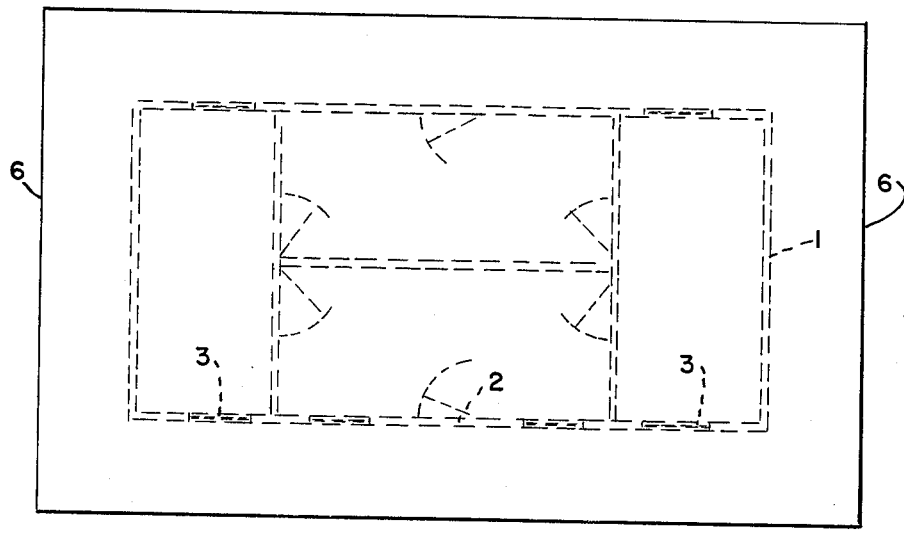

FIG. 6 illustrates a small pond type device adaptable for factory production and usable on the flat roof design buildings of FIGS. 1, 2, 3 and 4. FIG. 7 illustrates several of these ponds on a flat roof building. The transparent bubble 15 may be rigid and self supporting, or air supported, or strut supported as described with regard to FIG. 5. Water 16 may be pumped, by pump 16', into small ponds 17 through large inlet pipe 18 each morning. After the uppermost pond is filled it overflows and the others are filled successively. The water may drain from each pond back to storage by way of outlets 19 and pipes connected to return pipe 20. Valve 21 may be opened at the end of the day to permit flow back to the place for storage and use for the night. Check valves 22 prevent flow to a lower pond from a higher pond. Or, outlets 19 may be very small to permit slow drainage, calculated to empty each small pond within several hours. As one example, the ponds may be filled at 9:00 A.M. and drain empty by 4:00 P.M. As the hours go by a portion of the warmed water returns to storage each hour to help keep the building warm. And, that remaining in the ponds and returning latter in the day becomes warmer and warmer. As another example, the ponds may be filled at 9:00 A.M. and drain empty by about noon. Then they may be filled again to drain empty a second time by about 4:00 P.M.

The drawing does not illustrate overflow of one small pond to fill the one therebelow. It will be understood that overflow is the normal process of spilling over a lip of a pond, or spilling over a fluted edge or spillway of a lip, or overflowing through a pipe or trough adjacent to the top, or other well-known overflow arrangements.

From the foregoing it will be apparent that a numer of features in the improved "Sunny South Model" are combined to increase heat collection, to reduce construction costs, to reduce roof beam bending, to beautify the structure, to protect the exterior of the building, to provide a protected walk area, and so on.

We claim:

1. Solar heat collecting apparatus for use on a more-or-less horizontal surface comprising means defining a solar heat collecting pond area, said pond area comprising a plurality of small heat collecting ponds one stepped upwardly from another, means to fill the uppermost pond with liquid until it spills over to fill the pond therebelow, return pipe means for liquid leaving said ponds, fluid conduit means inter-connecting the ponds and return pipe means to permit each pond to drain, means in said return pipe to permit or stop draining as desired, and means to prevent flow from the uppermost pond to the pond therebelow through said conduit means and return pipe.

2. Solar heat collecting apparatus as in claim 1 and a transparent member covering said pond area.

3. Solar heat collecting apparatus as in claim 1 and an additional solar heat collecting pond area adjacent to said first mentioned pond area.

4. Apparatus as in claim 1 and pump means operable to fill said plurality of ponds periodically as desired.

* * * * *